United States Patent
Hu

(10) Patent No.: US 8,500,080 B2
(45) Date of Patent: Aug. 6, 2013

(54) ROD SECURING DEVICE

(75) Inventor: Wang Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 12/889,543

(22) Filed: Sep. 24, 2010

(65) Prior Publication Data

US 2011/0260010 A1 Oct. 27, 2011

(30) Foreign Application Priority Data

Apr. 27, 2010 (CN) .......................... 2010 1 0157236

(51) Int. Cl.
*A47B 91/00* (2006.01)
*A47G 29/00* (2006.01)
*B65D 19/00* (2006.01)

(52) U.S. Cl.
USPC ............... 248/346.07; 248/74.4; 248/229.12; 248/229.14; 248/346.01; 248/346.03; 248/346.06

(58) Field of Classification Search
USPC ............... 248/74.4, 229.12, 229.14, 346.01, 248/346.03, 346.06, 346.07; 269/289 R, 269/291, 309–310; 108/143, 158.13, 158, 108/159, 159.11
See application file for complete search history.

(56) References Cited

U.S. PATENT DOCUMENTS

| | | | | |
|---|---|---|---|---|
| 4,526,333 A | * | 7/1985 | Nakama et al. | 248/73 |
| 4,890,725 A | * | 1/1990 | Fierkens et al. | 198/774.1 |
| 5,457,745 A | * | 10/1995 | Wang | 379/454 |
| 5,555,302 A | * | 9/1996 | Wang | 379/446 |
| 5,836,563 A | * | 11/1998 | Hsin-Yung | 248/316.4 |
| 6,161,803 A | * | 12/2000 | Daoud | 248/68.1 |
| 6,196,824 B1 | * | 3/2001 | Foltuz et al. | 425/190 |
| 6,206,674 B1 | * | 3/2001 | Foltuz et al. | 425/185 |
| 6,811,391 B1 | * | 11/2004 | Klaus et al. | 425/556 |
| 7,252,350 B2 | * | 8/2007 | Chen et al. | 312/223.2 |
| 7,389,964 B2 | * | 6/2008 | Ye | 248/231.61 |
| 7,407,143 B1 | * | 8/2008 | Chen | 248/309.1 |
| 7,500,843 B2 | * | 3/2009 | Crain et al. | 425/185 |
| 7,607,629 B1 | * | 10/2009 | Carrasco et al. | 248/346.07 |
| 2006/0017187 A1 | * | 1/2006 | Vantrease | 264/40.1 |
| 2007/0284500 A1 | * | 12/2007 | Fan | 248/346.06 |
| 2009/0084921 A1 | * | 4/2009 | Tu | 248/313 |

* cited by examiner

*Primary Examiner* — Terrell McKinnon
*Assistant Examiner* — Michael McDuffie
(74) *Attorney, Agent, or Firm* — Altis Law Group, Inc.

(57) ABSTRACT

A rod securing device includes a securing plate and a first driving arm. The securing plate is capable of receiving a rod. The first driving arm is located in the securing plate. The first driving arm is capable of moving along a first direction. The first driving arm includes a first engaging portion and is capable of moving from a securing position, where the first engaging portion of the first driving arm is capable of engaging the rod received in the securing plate, to a release position, where the first engaging portion is capable of being disengaged from the rod received in the securing plate.

6 Claims, 6 Drawing Sheets

ROD SECURING DEVICE

BACKGROUND

1. Technical Field

The present disclosure relates to a rod securing device, and particularly to a rod securing device in a mold apparatus.

2. Description of Related Art

A conventional mold apparatus includes an upper mold, a lower mold, and an ejector plate. A rod is installed in the ejector plate to eject a product. The rod is secured in the ejector plate with screws. It is time-consuming to install the rod in the ejector plate.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
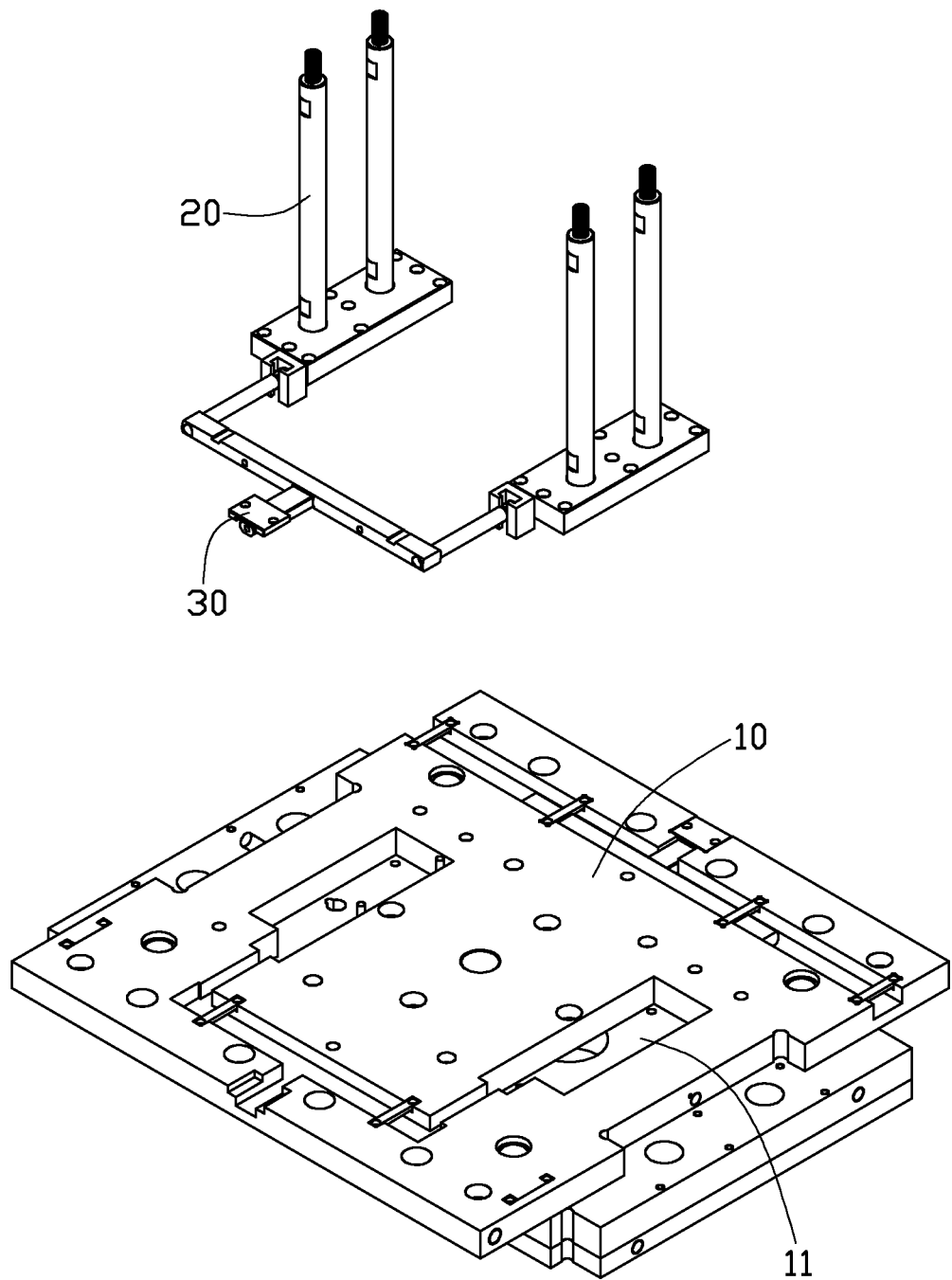
FIG. 1 is an exploded view of a rod securing device in accordance with an embodiment.

Referring to FIG. 1, a rod securing device 30 in accordance with an embodiment is configured for securing a rod 20 in a securing member 10. The securing member 10 includes a receiving portion 11 to receive the rod securing device 30.

Figure 2:
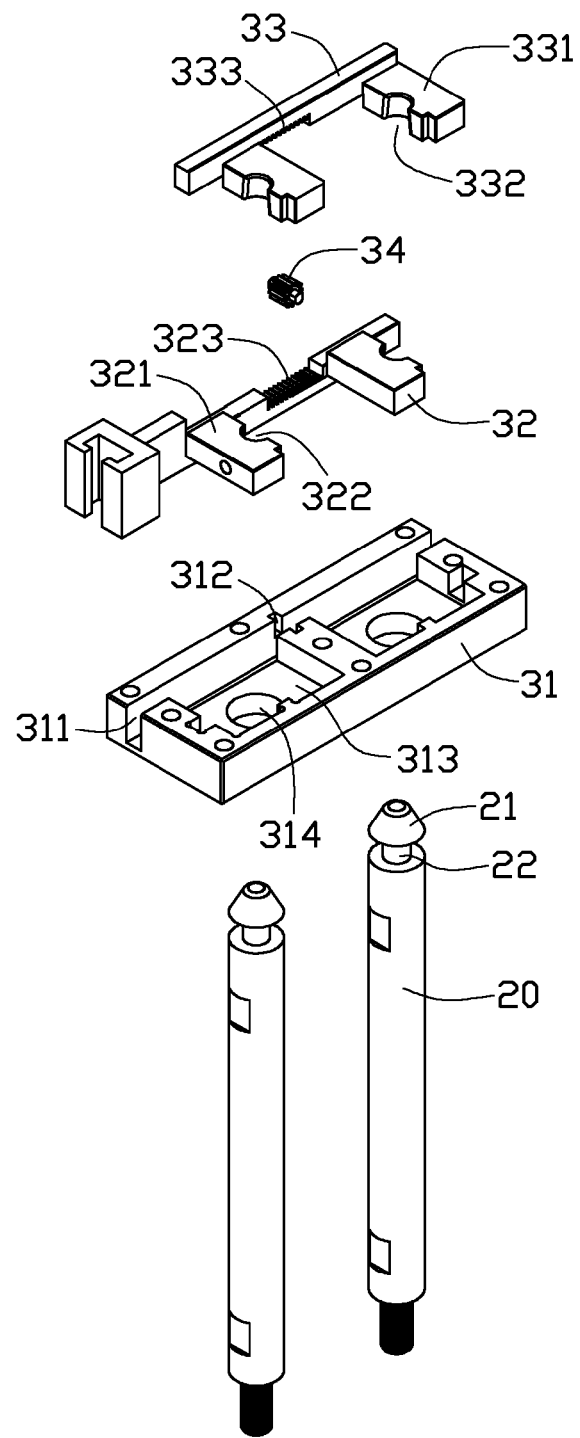
FIG. 2 is similar to FIG. 1, but viewed from another aspect.
Figure 3:
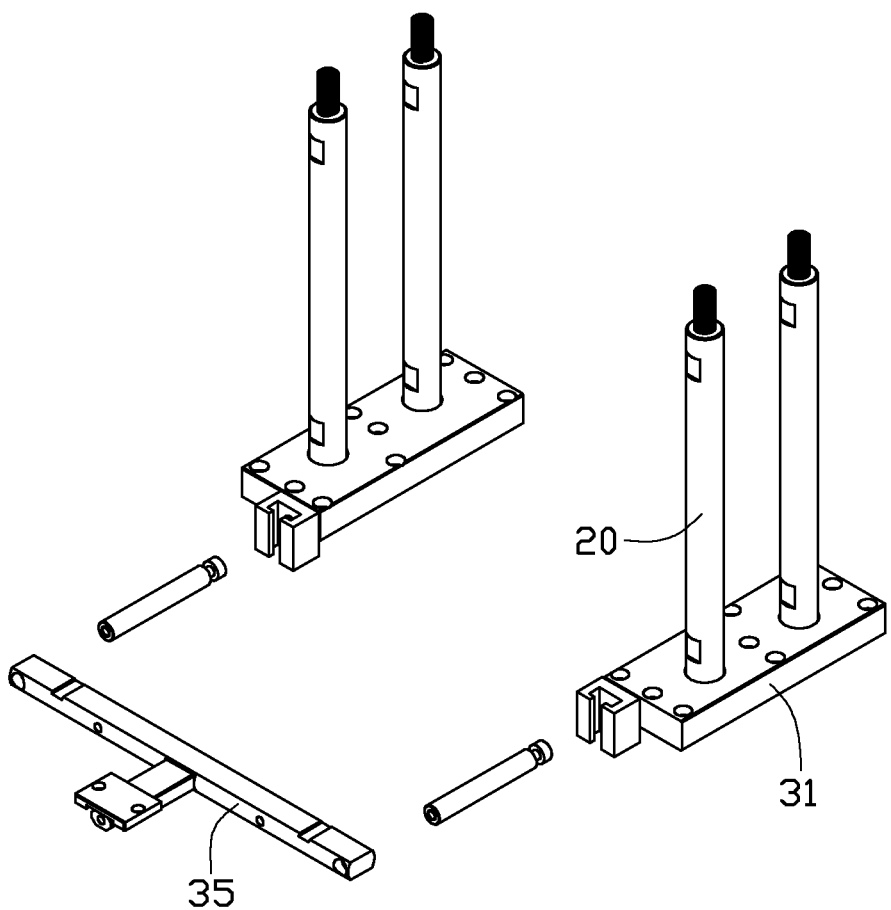
FIG. 3 is an isometric view of a rod and a securing plate of FIG. 1.
Figure 4:
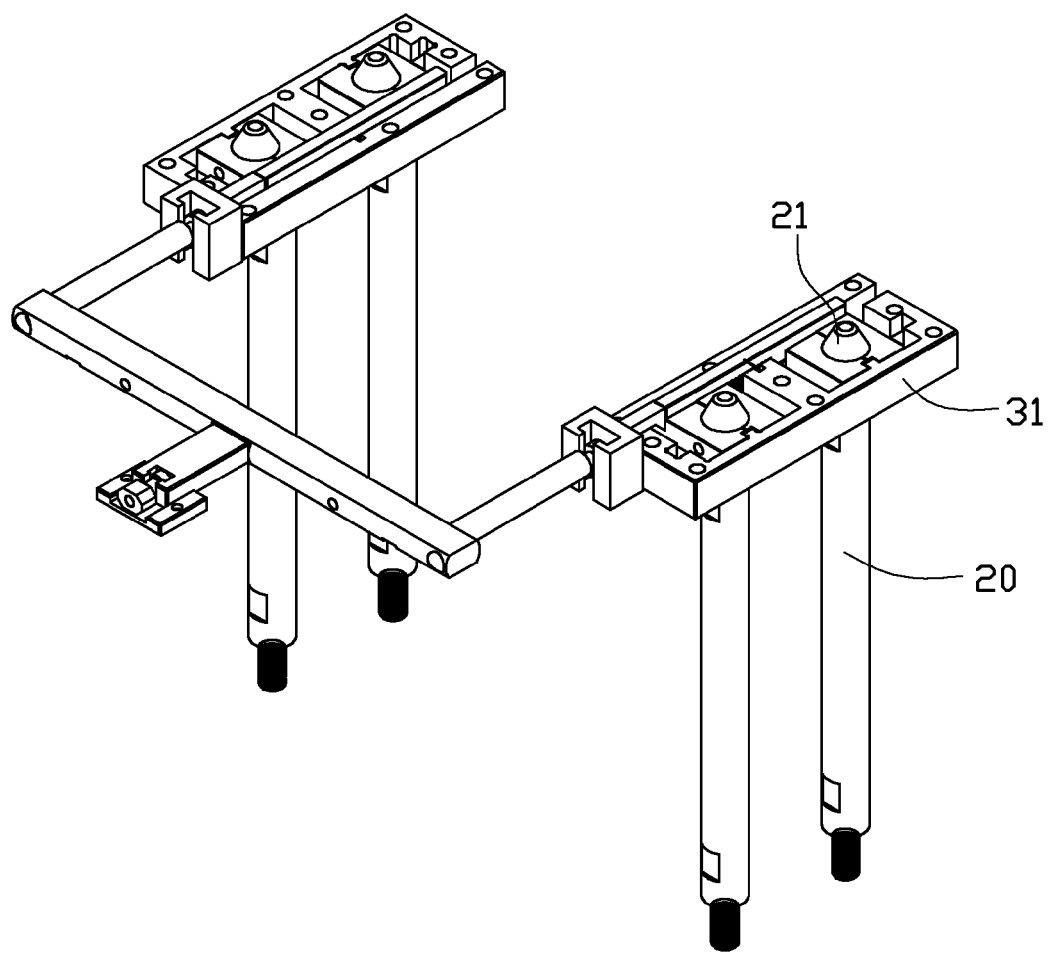
FIG. 4 is another isometric view of the rod and the securing plate.

Referring to FIGS. 2-4, the rod securing device 30 includes a securing plate 31, a first driving arm 32, a second driving arm 33, a gear 34, and a pulling portion 35. A groove 311 is defined in the securing plate 31 to receive the first driving arm 32 and the second driving arm 33. A slot 312 is defined in the securing plate 31 to receive the gear 34. A recess 313 is defined in the securing plate 31 communicating with the groove 311. A hole 314 is defined in the securing plate 31 to receive the rod 20.

A first projection 321 extends from the first driving arm 32. The first projection 321 includes a first engaging portion 322. The first engaging portion 322 is a semicircular indentation. The first driving arm 32 includes a toothed portion 323 to mesh with the gear 34. The first driving arm 32 connects to the pulling portion 35. The second driving arm 33 also includes a second projection 331. The second projection 331 includes a second engaging portion 332. The second engaging portion 332 also has a semicircular indentation. The second driving portion 33 includes a toothed portion 333 to mesh with the gear 34. The first projection 321 and the second projection 331 are located on the same plane. The rod 20 includes a tapered head portion 21 and a neck portion 22.

Figure 5:
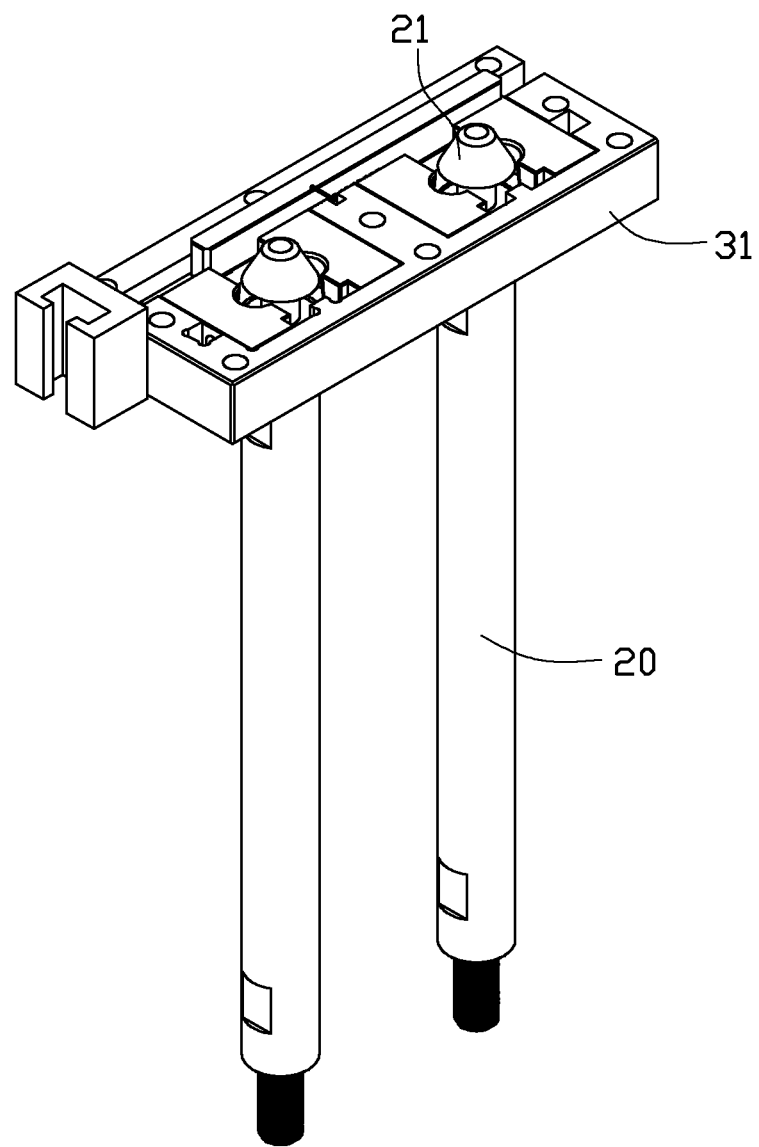
FIG. 5 is an isometric view of the rod disengaging from the securing plate.
Figure 6:
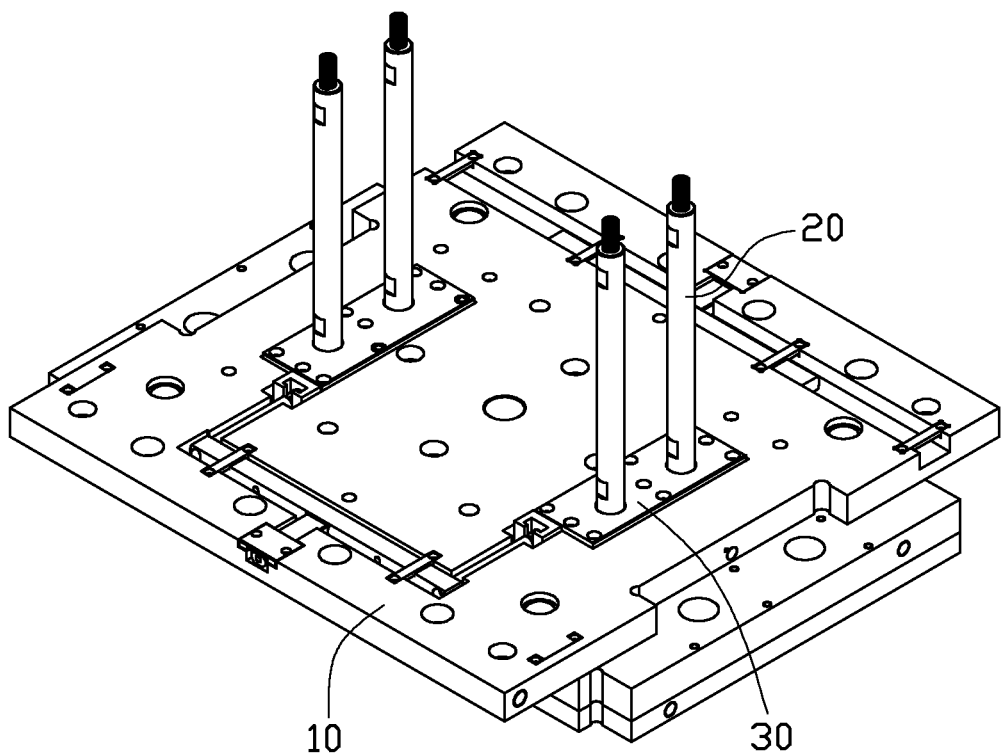
FIG. 6 is an assembled view of the rod securing device of FIG. 1.

Referring to FIGS. 5-6, in assembly, the first driving arm 32 is secured in the groove 311 of the securing plate 31. The gear 34 is installed in the slot 312 of the securing plate 31. The second driving arm 33 is mounted above the gear 34. The pulling portion 35 connects to the first driving arm 32. The securing plate 31 is located in receiving portion 11 of the securing member 10. When the rod 20 is pushed toward the securing member 10, the head portion 21 of the rod 20 is first inserted into the hole 314 of the securing plate 31. The head portion 21 continues sliding to resist against surfaces bounding the first engaging portion 322 and the second engaging portion 332. The first driving arm 32 slides in a first direction. By virtue of the gear 34, the second driving arm 33 slides in a second direction that is opposite to the first direction. The first engaging portion 322 disengages from the second engaging portion 332. The neck portion 22 of the rod 20 is received in an aperture defined between the first engaging portion 322 and the second engaging portion 332. A diameter of the aperture is smaller than a biggest diameter of the head portion 21.

The pulling portion 35 pushes the first driving arm 32 towards the second direction. The second driving arm 33 moves in the first direction. The first engaging portion 322 moves towards the second engaging portion 332. The head portion 21 is locked in the securing member 10.

When the rod 20 is unlocked from the securing member 10, the pulling portion 35 is moved. The pulling portion 35 pulls the first driving arm 32 towards the first direction. By virtue of the gear 34, the second driving arm 33 slides in the second direction. The first engaging portion 322 moves away from the second engaging portion 332. The rod 20 is unlocked from the securing member 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A rod securing device comprising:
a securing plate, capable of receiving a rod;
a gear located on the securing plate;
a first driving arm located in the securing plate, and capable of moving along a first direction, and the first driving arm comprising a first engaging portion; and
a second driving arm movably located on the securing plate, the second driving arm being movable with first driving arm through the gear;
wherein the first driving arm is capable of moving from a securing position, where the first engaging portion of the first driving arm is capable of engaging the rod received in the securing plate, to a release position, where the first engaging portion is capable of being disengaged from the rod received in the securing plate; the gear is configured to rotate about an axis that is perpendicular to the first direction, the second driving arm comprises a second engaging portion capable of cooperating with the first engaging portion to engage the rod, the first engaging portion and the second engaging portion are semicircular indentations, each of the first driving arm and the second driving arm comprises a projection, and the first engaging portion and the second engaging portion extend from the projections, a recess is defined in the securing plate, the projection of the first driving arm and the projection of the second driving arm are received in the recess in the securing position and the release position, and a plurality of holes are defined in the securing plate corresponding to the first engaging portion and the second engaging portion.

2. The rod securing device of claim 1, wherein the first driving arm and the second driving arm respectively comprises a toothed portion capable of engaging the gear, and the first driving arm and the second driving arm are capable of moving away from each other.

3. The rod securing device of claim 1, wherein the second driving arm is located above the first driving arm, and the projection of the first driving arm and the projection of the second driving arm are in the same plane.

4. A rod securing device comprising:
 a first driving arm, the first driving arm comprising a first engaging portion;
 a second driving arm being configured to move along a second direction driven by the first driving arm when the first driving arm moves along a first direction, the second direction being opposite to the first direction, the first the second driving arm comprising a second engaging portion;
 a gear capable of rotating about an axis that is perpendicular to the first direction, and the second driving arm is driven by the first driving arm via the gear;

wherein the first driving arm and the second driving arm are capable of moving from a securing position, where the first engaging portion and the second driving arm are capable of engaging a rod cooperatively, to a release position, where the first engaging portion and the second engaging portion are capable of being disengaged from the rod, the first engaging portion and the second engaging portion are semicircular indentations, each of the first driving arm and the second driving arm comprises a projection, and the first engaging portion and the second engaging portion extend from the projections, a recess is defined in the securing plate, the projection of the first driving arm and the projection of the second driving arm are received in the recess, and a plurality of holes are defined in the securing plate corresponding to the first engaging portion and the second engaging portion.

5. The rod securing device of claim 4, wherein the first driving arm and the second driving arm respectively comprise a toothed portion capable of engaging the gear, and the first driving arm and the second driving arm are capable of moving away from each other.

6. The rod securing device of claim 4, wherein the second driving arm is located above the first driving arm, and the projection of the first driving arm and the projection of the second driving arm are in the same plane.

\* \* \* \* \*